UNITED STATES PATENT OFFICE.

ABRAHAM B. McKEON, OF RUTHERFORD PARK, NEW JERSEY.

IMPROVEMENT IN CONCRETE PAVEMENTS.

Specification forming part of Letters Patent No. 109,333, dated November 15, 1870; antedated November 5, 1870.

I, ABRAHAM B. McKEON, of Rutherford Park, county of Bergen, and State of New Jersey, have invented new and useful Improvements in the Compounding of Materials for Concrete Pavements, of which the following is a specification:

Nature and Object.

My invention relates to that class of pavements in which silicious substances—as gravel, broken stone, and cinders—form the basis of the concrete, but which require to be united by some adhesive substance—as tar, asphalt, rosin, and sulphur—so that the mass shall form a road of the greatest possible endurance under the abrading action of travel or the extremes of heat and cold.

To accomplish such an object, I prepare a mixture or compound consisting of pine-tar, twelve gallons; asphalt, twelve gallons, when melted; coal-tar, six gallons; rosin, three gallons, when melted; and sulphur, two pounds to every thirty-three gallons of the above, when thoroughly incorporated with each other, both by heating and stirring them together.

Said mixture is then applied to the surfaces of the silicious materials, whatever they may be formed from, they having been previously heated until they are thoroughly dry, and at a temperature sufficiently great to keep the adhesive substances in a plastic state while being laid in the roadway, and rolled or tamped, as is commonly done in the formation of such pavements.

Several years' experience in construction of such pavements has led me to believe that the proportions here given (as nearly as possible) of such elements are the best adapted for the streets and roadways of this country; therefore I do not claim any of these ingredients separately; but

I claim—

The combination of pine-tar, asphalt, coal-tar, rosin, and sulphur, in the proportions hereinbefore described, and for the purpose set forth.

A. B. McKEON.

Witnesses:
   BOYD ELIOT,
   IGN. HAHN.